(12) United States Patent
Wagner et al.

(10) Patent No.: US 11,402,304 B2
(45) Date of Patent: Aug. 2, 2022

(54) ENVIRONMENTAL SAMPLING SYSTEM AND METHOD

(71) Applicant: United Technologies Corporation, Farmington, CT (US)

(72) Inventors: Joel H. Wagner, Wethersfield, CT (US); Kevin W. Schlichting, South Glasontbury, CT (US); Michael Joseph Murphy, Windsor, CT (US); Steven H. Zysman, Amston, CT (US); Nigel David Sawyers-Abbott, South Glastonbury, CT (US); Andrew A. Consiglio, Branford, CT (US); Charles Waldo Haldeman, IV, Simsbury, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 355 days.

(21) Appl. No.: 16/502,242

(22) Filed: Jul. 3, 2019

(65) Prior Publication Data

US 2021/0003485 A1 Jan. 7, 2021

(51) Int. Cl.
  *G01N 1/22* (2006.01)
  *G01N 23/223* (2006.01)

(52) U.S. Cl.
  CPC ......... *G01N 1/2273* (2013.01); *G01N 1/2205* (2013.01); *G01N 1/2252* (2013.01); *G01N 23/223* (2013.01)

(58) Field of Classification Search
  CPC .. G01N 1/2273; G01N 1/2205; G01N 1/2252; G01N 23/223; G01N 2001/2279; B64D 2045/0085; B64D 47/00
  See application file for complete search history.

(56) References Cited

U.S. PATENT DOCUMENTS

| 7,073,748 B2 | 7/2006 | Maurer et al. |
| 2002/0062702 A1 | 5/2002 | Bradley |

(Continued)

FOREIGN PATENT DOCUMENTS

| EP | 3100022 | 12/2016 |
| WO | 20160185467 | 11/2016 |

OTHER PUBLICATIONS

Levin, Z., Teller, A., Ganor, E., and Yin, Y. (2005). On the interactions of mineral dust, sea-salt particles, and clouds: A measurement and modeling study from the Mediterranean Israeli Dust Experiment campaign. Journal of Geophysical Research: Atmostpheres. vol. 110(D20). Oct. 22, 2005. pp. 1-49.

(Continued)

*Primary Examiner* — David Z Huang
(74) *Attorney, Agent, or Firm* — Carlson, Gaskey & Olds, P.C.

(57) ABSTRACT

An environmental sampling system includes a passage in an aircraft component and a removable collector disposed in the passage. The passage has an inlet at a first region and an outlet at a second region. When the aircraft component is in operation the first region is at a greater pressure than the second region such that air flows through the passage from the inlet to the outlet. The removable collector is configured to retain constituents from the air and to react with the media designed to mimic corrosion effects seen at higher temperatures on engine parts. The constituents can then be characterized and correlated to engine deterioration to predict maintenance activity.

14 Claims, 7 Drawing Sheets

(56) References Cited

U.S. PATENT DOCUMENTS

| | | |
|---|---|---|
| 2004/0185554 A1 | 9/2004 | Daitch et al. |
| 2005/0247105 A1* | 11/2005 | Dikken .................. B01D 69/10 73/28.04 |
| 2009/0139191 A1 | 6/2009 | Roundy et al. |
| 2014/0260530 A1 | 9/2014 | Mitchell et al. |
| 2015/0226128 A1 | 8/2015 | Byrd et al. |
| 2016/0097311 A1 | 4/2016 | Coelho Ferreira |
| 2018/0068498 A1* | 3/2018 | Hodge ............... G01N 15/0205 |
| 2019/0039739 A1 | 2/2019 | Winter et al. |
| 2019/0112981 A1 | 4/2019 | Bergami |
| 2019/0255474 A1* | 8/2019 | Ryan .................. B01D 46/0015 |

OTHER PUBLICATIONS

Davison, C.R. and Rutke, T.A. (2014). Assessment and characterization of volcanic ash threat to gas turbine engine performance. Journal of Engineering for Gas Turbine and Power. vol. 136. Aug. 2014.

Grindle, T.J. and Burcham, Jr., F.W. (2003). Engine damage to a NASA DC-8-72 airplane from a high-altitude encounter with a diffuse volcanic ash cloud. NASA/TM-2003-212030. Technical Memorandum. Aug. 2003. pp. 1-22.

European Search Report for European Patent Application No. 20184058.4 completed Nov. 16, 2020.

* cited by examiner

ENVIRONMENTAL SAMPLING SYSTEM AND METHOD

BACKGROUND

Gas turbine engines typically include a compressor section, a combustion section, and a turbine section. Ambient air is ingested and compressed in the compressor section. The compressed air is mixed with fuel and burned in the combustion section. The combustion products are expanded in the turbine section, which drives the compressor section. Engines used for propulsion include a fan that is also driven by the turbine section. The fan moves air through a bypass duct to generate thrust. The air ingested into the engine may include corrosive gases, dirt particles, insects, or other airborne debris that may come into contact with engine components.

SUMMARY

An environmental sampling system according to an example of the present disclosure includes a passage in an aircraft component. The passage has an inlet at a first region and an outlet at a second region. When the aircraft component is in operation the first region is at a greater pressure than the second region such that air flows through the passage from the inlet to the outlet. There is a removable collector disposed in the passage. The removable collector is configured to retain constituents from the air.

In a further embodiment of any of the foregoing embodiments, the aircraft component is selected from the group consisting of an airfoil, a spinner, a compressor bleed line, a bypass duct, a gas turbine engine inlet, and combinations thereof.

In a further embodiment of any of the foregoing embodiments, the removable collector is a rigid porous body.

In a further embodiment of any of the foregoing embodiments, the rigid porous body is selected from the group consisting of a porous ceramic, a porous metal, a porous polymer, and combinations thereof.

In a further embodiment of any of the foregoing embodiments, the rigid porous body is a porous ceramic.

In a further embodiment of any of the foregoing embodiments, the rigid porous body is a porous metal.

In a further embodiment of any of the foregoing embodiments, the rigid porous body is a porous polymer.

In a further embodiment of any of the foregoing embodiments, the rigid porous body has an average pore size of 1 micrometers to 10 micrometers.

In a further embodiment of any of the foregoing embodiments, the removable collector includes a plurality of rigid porous bodies arranged in series through the passage with varying pore sizes.

A further embodiment of any of the foregoing embodiments includes a valve disposed in the passage.

A method of environmental sampling according to an example of the present disclosure includes providing an environmental sampling system in an aircraft. The environmental sampling system has a collector that receives ambient aircraft air thereto when the aircraft flies. The collector retains constituents from the air. After the aircraft has flown, the constituents are collected by either removing the collector from the aircraft or removing the constituents from the collector. The constituents are then analyzed to determine at least one characteristic associated with the constituents.

In a further embodiment of any of the foregoing embodiments, the collecting of the constituents includes removing the collector from the aircraft.

In a further embodiment of any of the foregoing embodiments, the collecting of the constituents includes removing the constituents from the collector while the collector is on the aircraft.

In a further embodiment of any of the foregoing embodiments, the analyzing includes weighing the removable collector.

In a further embodiment of any of the foregoing embodiments, the analyzing includes performing an elemental analysis.

In a further embodiment of any of the foregoing embodiments, the analyzing includes performing x-ray analysis.

In a further embodiment of any of the foregoing embodiments, the analyzing includes extracting the constituents from the removable collector using a carrier fluid.

In a further embodiment of any of the foregoing embodiments, the analyzing includes performing a particle size analysis.

In a further embodiment of any of the foregoing embodiments, the analyzing is selected from the group consisting of weighing the removable collector, performing an elemental analysis, performing x-ray analysis, extracting the constituents from the removable collecting using a carrier fluid, performing particle size analysis, and combinations thereof.

A further embodiment of any of the foregoing embodiments includes correlating the at least one characteristic to deterioration of a gas turbine engine.

An environmental sampling system according to an example of the present disclosure includes a passage in an aircraft component. The passage has an inlet at a first pressure region and an outlet at a second pressure region. When the aircraft component is in operation the first pressure region is greater than the second pressure region such that air flows through the passage from the inlet to the outlet. A gas detector is disposed in the passage.

In a further embodiment of any of the foregoing embodiments, the gas detector is a gas sensor.

In a further embodiment of any of the foregoing embodiments, the gas detector is a gas probe.

An environmental sampling system according to an example of the present disclosure includes an aircraft component that has a surface on which an air flow impinges when the aircraft component is in operation, and an accumulator that has a chamber and an inlet tube that is open to the surface and that extends into the chamber.

In a further embodiment of any of the foregoing embodiments, the aircraft component is a spinner.

In a further embodiment of any of the foregoing embodiments, the chamber includes a screen dividing an interior of the chamber into a first region and a second region.

In a further embodiment of any of the foregoing embodiments, the chamber includes a liquid in the second region and the inlet tube opens at the second region.

In a further embodiment of any of the foregoing embodiments, the accumulator includes an outlet passage that opens at the first region and a feed tube that opens at the second region.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
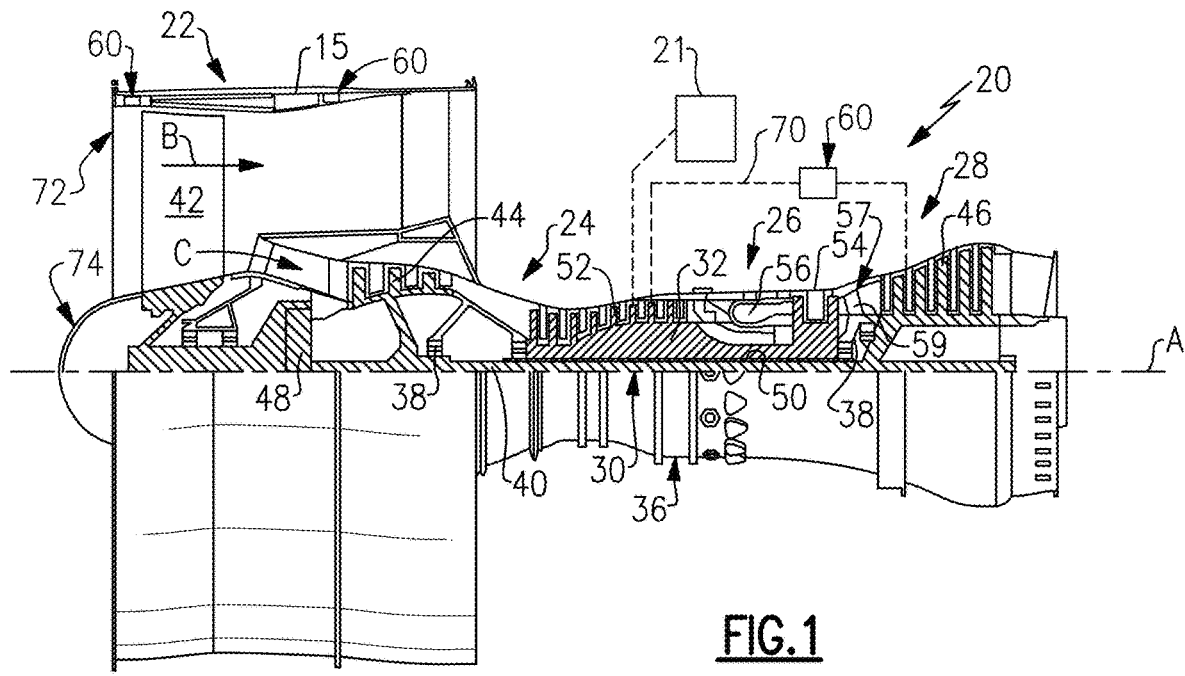
FIG. 1 illustrates an example gas turbine engine and aircraft.

FIG. 1 schematically illustrates a gas turbine engine 20 mounted on an aircraft 21 (shown schematically). The gas turbine engine 20 disclosed is a two-spool turbofan that generally incorporates a fan section 22, a compressor section 24, a combustor section 26 and a turbine section 28. The fan section 22 drives air along a bypass duct B defined within a nacelle or case 15, and also drives air along a core flow path C for compression and communication into the combustor section 26 then expansion through the turbine section 28. Although depicted as a two-spool turbofan gas turbine engine in the disclosed non-limiting embodiment, the examples described herein are not limited to use with two-spool turbofans and the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is characterized by a pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ("TSFC")"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]◯0.5. The "Low corrected fan tip speed" as disclosed herein according to one non-limiting embodiment is less than about 1150 ft/second (350.5 meters/second).

Figure 2:
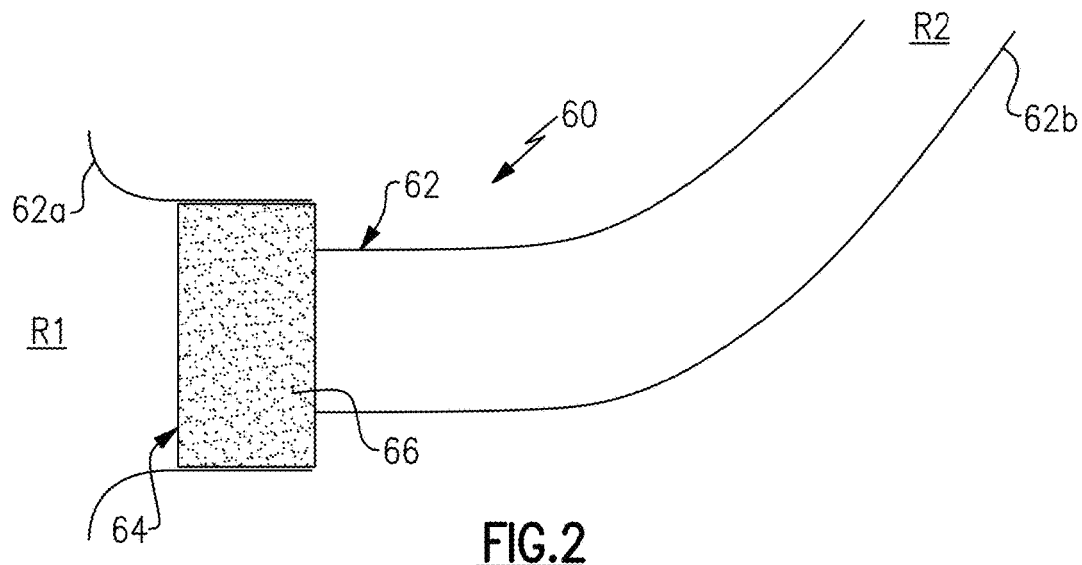
FIG. 2 illustrates an environmental sampling system.

When the aircraft 21 is in flight, the engine 20 ingests surrounding ambient air, a portion of which flows into the core flow path C and a remainder of which flows through the bypass duct B. The air may include entrained solids, such as dirt particles, insects, or other airborne debris, as well as gaseous compounds, such as sulfur-containing compounds (e.g., sulfur dioxide). Collectively, these solids and gaseous compounds, or constituents, may be referred to herein as foreign substances, i.e., substances besides nitrogen and oxygen in the air. Some foreign substances may be benign to engine health but others, such as gaseous sulfur compounds and calcium-magnesium-aluminosilicate solids (known as CMAS) from dirt, can cause degradation of engine components. For instance, the foreign substances can cause corrosion, spallation of coatings, or cracking that may reduce the useful life of an engine component. Heretofore, there has been an incomplete understanding of the quantity of foreign substances that are ingested into an engine and, therefore, no ability to utilize knowledge of ingested foreign substances as an input for engine or aircraft management. It is in this regard that the engine 20 and/or aircraft 21 includes an environmental sampling system 60 (hereafter "system 60"), an example of which is shown in FIG. 2. As will be described herein, the system 60 (and variations thereof) provides the ability to capture and subsequently quantify foreign substances ingested into the engine 20.

In general, the system 60 is located in the engine 20 and/or on the aircraft in a location that receives ambient air when the engine 20 and/or aircraft 21 is in operation, e.g., in flight. Non-limiting exemplary locations will be described in further detail below.

In the example illustrated in FIG. 2, the system 60 includes a passage 62 and a removable collector 64 disposed in the passage 62. As used herein, the term "removable" means that the collector 64 is able to be taken off of or out of the passage 62, without destruction of the collector 64 (e.g., fracturing, chemically altering, etc.). In this regard, the collector 64 is temporarily secured in the passage 62. The technique of securing is not particularly limited and may include, but is not limited to, fasteners, interference fits, and mechanical interlocking.

The passage 62 is in either the aircraft 21 or a component of the engine 20, or if multiple systems 60 are used there may be multiple passages 62 in the engine 20, the aircraft 21, or both. The passage 62 defines an inlet 62a at a first region, designated at R1, and an outlet 62b at a second region, designated at R2. The location of the passage 62 with respect to the regions R1/R2 is selected such that, during operation of the aircraft 21 and engine 20, the static pressure at region R1 is greater than the static pressure at region R2. This pressure differential causes flow of the air through the passage 62, and thus also flow of the air through the collector 64.

The collector 64 is configured to retain constituents (at least a portion of the foreign substances) from the air. In this regard, the collector 64 includes or is constituted of a rigid porous body 66. As used herein, the term "rigid" means that the body 66 substantially maintains its shape under the aerodynamic forces imparted by the air flow through the body 66.

Figure 3:
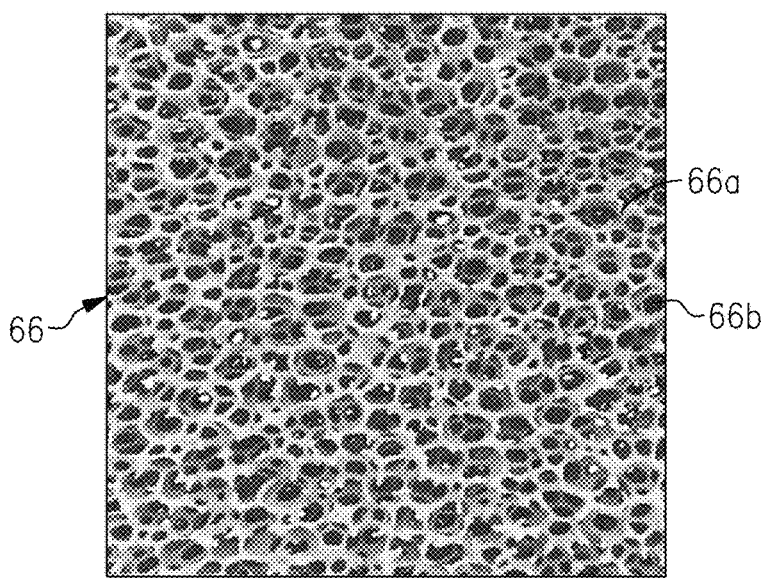
FIG. 3 illustrates an example of a rigid porous body of an environmental collector.

FIG. 3 illustrates an example of a representative portion of the body 66. In this example, the body 66 has a reticulated structure that includes an interlaced network of pore walls or tendrils 66a that define there between a random arrangement of interconnected pores 66b. That is, the body 66 has an open porosity such that the air can flow there through.

The structure of body 66 with regard to the pores 66b is configured to capture and retain one or more target foreign substances and can be custom designed for the expected particle size that varies from 1 to 100 micrometers. As an example, the pores 66b have an average pore size (diameter) of 1 micrometer to 10 micrometers to capture particulate greater than 1 micron, the pore size of which can be determined by a known gas absorption technique. Such a pore size is adapted to capture and retain dirt particles in the air. Most typically, however, the average pore size may be from 1 micrometers to 10 micrometers.

The material from which the body 66 is formed is selected from a porous ceramic, a porous metal, a porous polymer, or combinations thereof. For instance, the material can be selected based on temperature, corrosion, and erosion requirements at the selected location of the passage 62. Examples of ceramics include, but are not limited to, oxide ceramics such as aluminum-based oxides, zirconium-based oxides, silicon-based oxides or carbides. Examples include Nextel ceramic fiber blankets or silicon carbide fiber weaves. Ceramic can be used in locations that have high temperature, severe corrosion conditions, or severe erosion conditions. Examples of metal or metal alloys include, but are not limited to, nickel or cobalt alloys, stainless steel, aluminum or alloys thereof, or metal foams that can be manufactured by casting, sintering, or plasma-spraying. One such example would be porous material made of sintered metal fibers which has a trade name of Feltmetal. Metals can be used in locations that have intermediate temperature, intermediate or low corrosion conditions, or intermediate or low erosion conditions. Examples of polymers include, but are not limited to, polyimide, polyamides, polyesters, and thermosetting plastics, for example melamine foams. Polymers can be used in locations that have low temperature, intermediate or high corrosion conditions, or low erosion conditions. The materials can be selected such that measurable corrosion of the porous material at lower temperatures can be determined from standard laboratory techniques, and this can be directly related to corrosion at higher temperature on aircrafts parts through analytical or empirical techniques.

The body 66 captures and retains foreign substances, such as dirt, from air that flows through the body 66 when the engine 20 and/or aircraft 21 is in operation. For instance, the pressure differential causes air flow through the passage 62 and body 66. Particles entrained in the air infiltrate the body 66 via the pores 66b. The pores 66b define a circuitous path through the body 66 such that the air can escape and flow to the outlet 62b of the passage 62. The walls/tendrils 66a of the body 66, however, impede the movement of particles through the body 66. Particles become wedged into the pores 66b and are thus retained in the body 66. As particles are retained, the retained particles can then also serve to block movement of additional particles. In this manner, but not limited thereto, particles are captured and retained in the body 66.

After the aircraft 21 has flown, the retained constituents (foreign substances) are collected by removing the collector 64 from the passage 62 and aircraft 21. The constituents are then analyzed to determine at least one characteristic associated with the constituents. For instance, the removed collector 64 may be transferred to a laboratory, analysis station, or the like for analysis. The characteristic or characteristics determined in the analysis can include, but are not limited to, weight analysis, elemental analysis, crystallographic analysis, and particle size analysis. Weight analysis may be performed by weighing the removed collector 64 and comparing the weight to the initial weight of the collector 64 prior to its use in the engine 20 or aircraft 21. The weight analysis thereby provides a measure of the amount of foreign substances collected by the collector 64. Elemental analysis may be performed by energy dispersive spectroscopy (EDS) or x-ray fluorescence. The elemental analysis thereby provides an indication of the chemical composition of the foreign substances. The crystallographic analysis can be performed by x-ray diffraction and provides an indication of crystal structure, or lack thereof (amorphous). The particle size analysis can be performed by microscopy and provides an indication of the size of particles retained in the collector 64.

One or more foreign substances can also be extracted from the collector 64 for analysis. For instance, foreign substances, such as salts, are extracted from the body 66 using a carrier fluid, such as but not limited to, water, alcohol or other polar solvent, or hexane or other non-polar solvent. The carrier fluid may dissolve all or a portion of the foreign substances and/or may physically "wash" all or a portion of the foreign substances without dissolution. The extracted foreign substances can then be analyzed by one or more of the techniques above and/or other techniques, such as but not limited to, wet chemical analysis. Overall corrosion rates can be measured by a weight comparison after all material is removed.

Subsequently, the information collected through the analysis is combined with one or more of engine operating conditions, flight path(s) (e.g. city pairs), and engine component distress to establish a correlation between one or more of the characteristics of the foreign substances and deterioration of the engine 20. For example, to establish such a correlation, one or more characteristics of the foreign substance are determined as above and distress on one or more engine components of the engine 20 is characterized. The characterization of the distress can include, but is it not limited to, characterization of coating spallation, corrosion, cracking, or the like. Compositional information of the foreign substance may be compared to compositional information of the distressed component, to link the foreign substance as a cause of the distress. One or more relationships can then be established between the characterization of the foreign substance and the characterization of the distress. Such relationships can also be combined with engine operating conditions (e.g., number of flights) and/or flight path to estimate, for example, the amount of foreign substance ingested per flight for a particular route and/or incremental distress to one or more engine components. Such correlations can then further be used to generate remaining useful life estimates and/or engine removal rate predictions without the need for engine teardown or detailed inspection of the turbomachinery and cavities.

In one example, flight times and flight paths are recorded for numerous aircraft having collectors 64. The collectors 64 are removed from the aircraft and analyzed for amount of CMAS, which is expected to range from a relatively low amount to a relatively high amount. Engine components (e.g., turbine vanes or blades) from the same aircraft/engines are inspected for CMAS degradation. From this, a relationship is established between the amount of CMAS in the collectors 64 and observed level of CMAS degradation in the engine components. In general, the relationship is such that higher amounts of CMAS in the collectors 64 corresponds to higher amounts of degradation in the engine components. The amount of CMAS determined in subsequent collectors 64 on other aircraft can then be compared to the established relationship to estimate the level of CMAS degradation. The estimates can, in turn, be used to trigger inspection, engine removal, or refurbishing if a threshold amount is determined. The relationship can also involve correlation to particular flight paths, to determine paths that have more or less CMAS and, as a result, more or less degradation. Additionally or alternatively, the relationships can be used to establish fleet business agreements, such as for operators in typically hot and dirty conditions where engines are severely distressed. Additionally or alternatively, the relationships can be used to establish fleet management plans, such as for operators in typically hot and dirty conditions where engines are severely distressed after relatively short time exposures. Additionally or alternatively, the relationships can be used to establish material resource planning and placement for spare parts and overhaul schedules.

Table 1 illustrates a further example of a correlation between a weight characterization of collected foreign substance and engine component distress. Intervals (in days) are shown at zero days, 2 days, 5 days, 10 days, and 20 days of weight characterizations from, respectively, four different collectors 64, which are flown over the same flight path. The distress characterization is of wall thickness loss of a thermal barrier coating on the same engine component from the engines associated with the four collectors 64. The interval-weight contaminant characterization and the wall thickness distress characterization are used to determine interval and accumulated data. Such data could then be plotted on a graph, which here from zero time would be an upward curved line. This data set is an example of what would be used to plot accumulated wall thickness loss vs. accumulated interval-weight of contaminant. The plot could then be used to predict how many oz-hours remain on an engine before the wall thickness reaches a designated minimum.

TABLE 1

Correlation data between a weight characterization of collected foreign substance and engine component distress.

| Interval | Collected (oz.) | Interval Wall Loss (in.) | Inverval Weight Contam. (oz./day) | Accumulated (oz./day) | Accumulated Wall Loss (in.) |
|---|---|---|---|---|---|
| 0 | 0 | | | | 0 |
| 5 day | 2 | 0.01 | 10 | 10 | 0.01 |
| 2 day | 0.5 | 0.003 | 1 | 11 | 0.013 |
| 20 day | 7 | 0.03 | 140 | 151 | 0.043 |
| 10 day | 3 | 0.005 | 30 | 181 | 0.048 |

As indicated above, the system 60 is located in the engine 20 and/or on the aircraft 21 in a location that receives ambient air when the engine 20 and/or aircraft 21 is in operation, e.g., in flight. Example locations can include, but are not limited to, a wing airfoil, a spinner, a compressor bleed line, a bypass duct, or a gas turbine engine nacelle inlet or fan bypass duct. Locations in the engine 20, and particularly in the spinner and compressor bleed line, may be especially representative of air ingested into the core engine.

Figure 4:
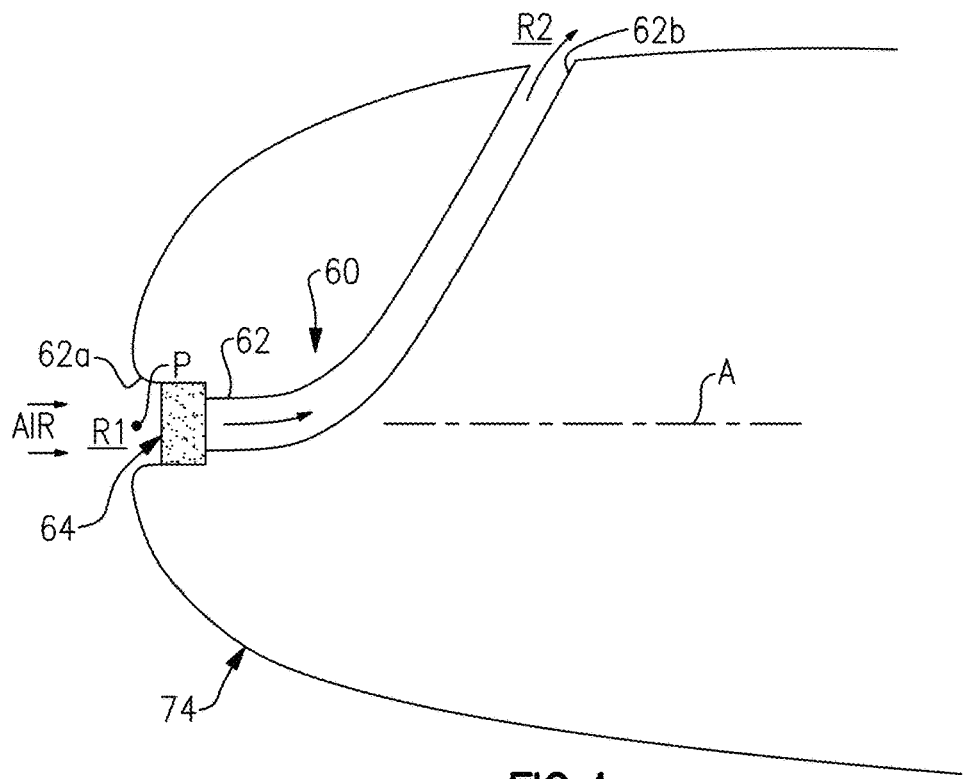
FIG. 4 illustrates an example of an environmental sampling system in an engine spinner.

FIG. 1 shows example locations of the system 60 in a compressor bleed line 70, the bypass duct B, and engine inlet 72. FIG. 4 illustrates an example of the system 60 in a fan inlet spinner 74. The spinner 74 is the aerodynamic cone at the hub of the fan 22. In this example, the inlet 62a of the passage 62 is located at or near the stagnation point P of the spinner 74. Such a location may facilitate ingestion of air into the passage 62 from a ram air effect, as opposed to locations where the air flows across the inlet 62a. The outlet 62b is located on the spinner 74 at an axially offset location downstream from the inlet 62a. At such a location, the region R2 is at a lower static pressure than region R1.

Figure 5:
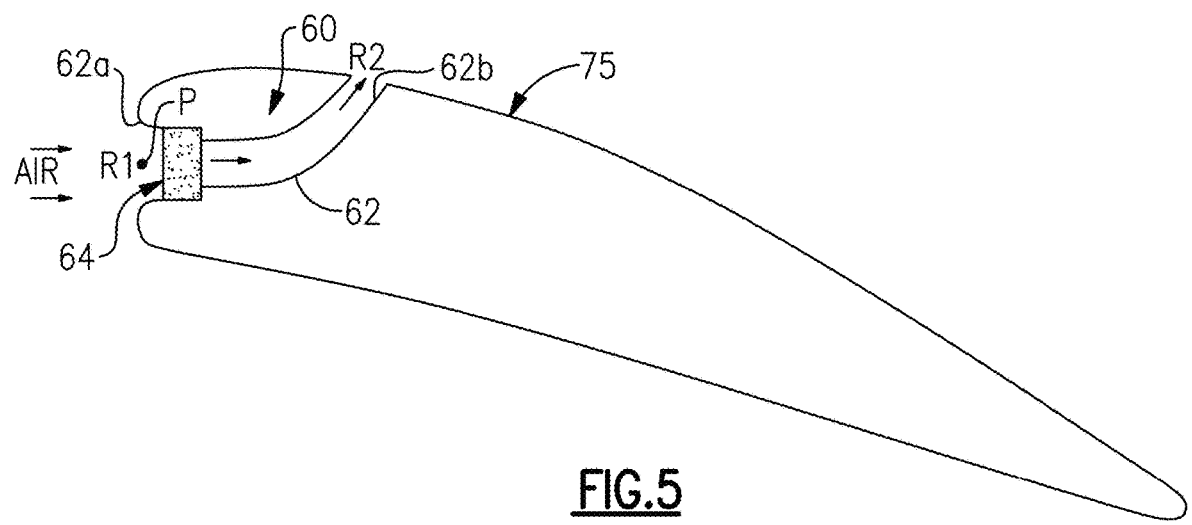
FIG. 5 illustrates an example of an environmental sampling system in an airfoil.

FIG. 5 illustrates an example of the system 60 in a wing airfoil 75. In this example, the airfoil 75 is an aircraft wing of the aircraft 21. In this example, like the spinner 74, the inlet 62a of the passage 62 is located at or near the stagnation point P of the airfoil 75. In variations of the above examples, inlet 62a in the spinner 74 or in the airfoil 75 is offset from the stagnation point determined to be the most favorable location for correlation to foreign substances ingested into the engine core.

Figure 6:
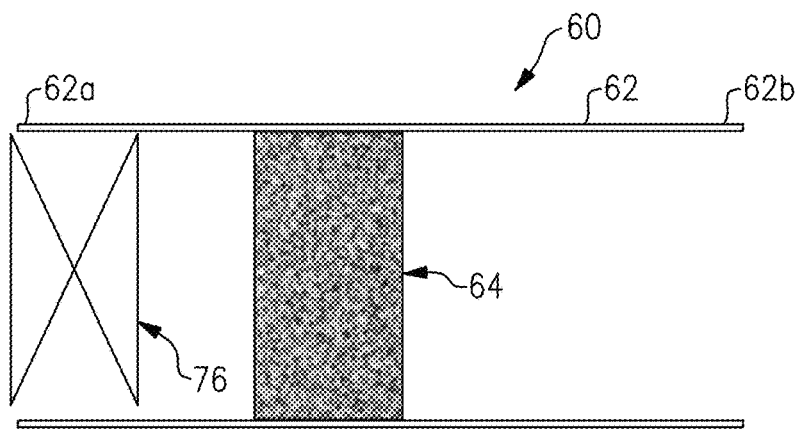
FIG. 6 illustrates an example of an environmental sampling system with a valve.

FIG. 6 illustrates a further example of the system 60 that can be implemented in any of the above examples. In this example, the system 60 includes a valve 76 disposed in the passage 62. As shown, the valve 76 is at the inlet 62a, although in variations the valve is located aft of the inlet 62a, or even at the outlet 62b. One example of the valve 76 is a gate-type, ball, butterfly, slider or flapper valve. The valve 76 can be selectively opened or closed to, respectively, allow or prevent air from flowing in the passage 62. For example, the state of the valve 76 (open or closed) depends on one or more flight conditions. For instance, at relatively low altitudes, there are more insects than at relatively high altitudes. If insects are not of concern as a target foreign substance to collect in the collector 64, the valve 76 can be operated such that it is closed at low altitudes and opened at high altitudes. Such a control scheme can be used to reduce or avoid plugging up the collector 64 with non-target foreign substances. Likewise, the valve can be opened only on particular flight paths of interest or only on particular legs of flight paths.

Figure 7:
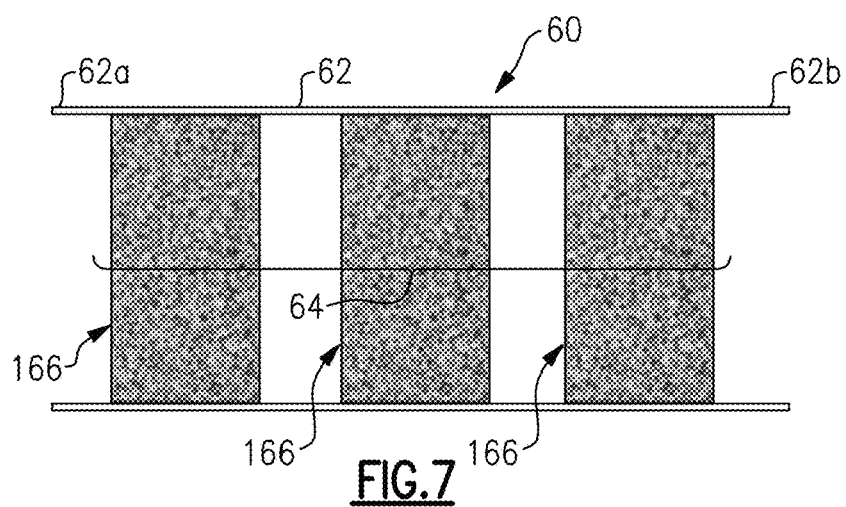
FIG. 7 illustrates an example of an environmental sampling system with a plurality of rigid porous bodies in series.

FIG. 7 illustrates a further example of the system 60 that can be implemented in any of the above examples. In this example, the collector 64 includes a plurality of rigid porous bodies 166 that are arranged in series through the passage 62. In this disclosure, like reference numerals designate like elements where appropriate and reference numerals with the addition of one-hundred or multiples thereof designate modified elements that are understood to incorporate the same features and benefits of the corresponding elements. As shown, the bodies 166 are spaced apart, although in variations the bodies are contiguous or adjoined. The bodies may be individually adapted to capture and retain different target foreign substances and/or different sizes of foreign substances. For instance, the average pore size (diameter) of the bodies successively decreases from the inlet 62a to the outlet 62b. Thus, larger particles are caught and retained by the first body 166, intermediate sized particles by the second body 166, and smaller particles by the third body 166.

Figure 8:
FIG. 8 illustrates an example of an environmental sampling system that has a gas detector.
Figure 8:
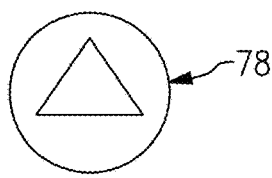

FIG. 8 illustrates another example of an environmental sampling system 160. In this example, rather than the collector 64 (or in addition to the collector 64), the system 160 includes a gas detector 78 disposed in the passage 62. While the collector 64 is configured to capture and retain solids, the gas detector 78 is configured to measure gaseous foreign substances ingested through the passage 62.

Figure 9:
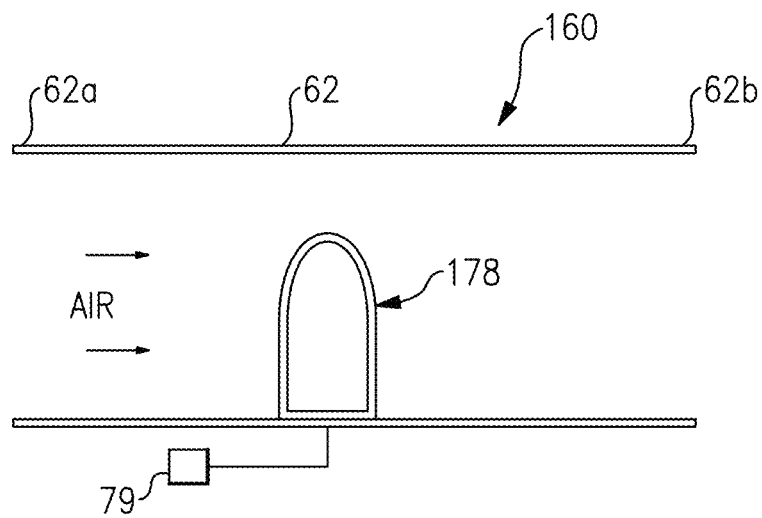
FIG. 9 illustrates an example with a gas probe.

FIG. 9 illustrates one example in which the gas detector is a gas probe 178. The gas probe 178 is operable to collect samples of the air flowing through the passage 62. The gas probe 178 may be connected with an analyzer 79. For example, the gas probe 178 collects samples and transfers the samples to the analyzer 79, which characterizes the sample gas. For instance, the characterization can include identification of the presence or not of one or more target gaseous compounds and/or measurement of the concentration of one or more target gaseous compounds.

Figure 10:
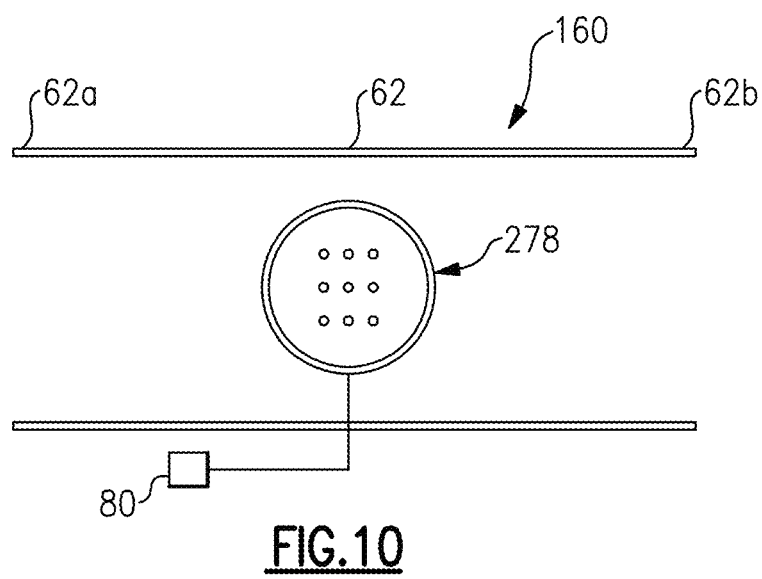
FIG. 10 illustrates an example with a gas sensor.

FIG. 10 illustrates one example in which the gas detector is a gas sensor 278. The gas sensor 278 is operable to detect the presence of one or more target gaseous foreign substances in the air flowing through the passage 62. The gas sensor 278 may be connected with a controller 80. For example, the gas sensor 278 detects the presence of one or more target gaseous foreign substances and transmits electrical signals to the controller 80. The signals may represent the presence and concentration of the one or more target gaseous foreign substances in the air flowing through the passage. In such gas detectors, similar to the solids collection described above, data can be collected on the one or more target gaseous foreign substances and correlated to distress of one or more engine components. For instance, periodic concentrations of one or more target gaseous foreign substances are taken and used to determine interval and accumulated data as described above with reference to Table 1.

Figure 11A:
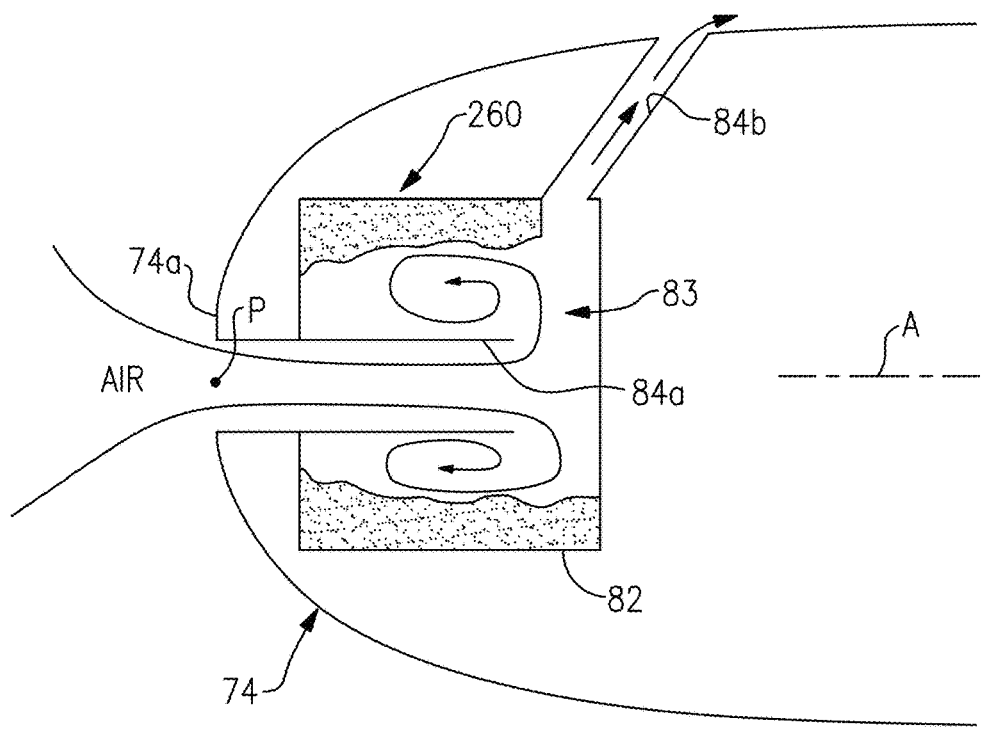
FIG. 11A illustrates an example of an environmental sampling system with an accumulator.

FIG. 11A illustrates another example environmental sampling system 260. In this example, the system 260 includes a collector or accumulator 82. As shown, the accumulator 82 is in the spinner 74, although it is to be understood that the accumulator 82 can alternatively be in other locations as described herein for the system 60. The spinner 74, or other aircraft component, has a surface 74a on which an air flow impinges when the aircraft component is in operation. The accumulator 82 is configured to receive the air and accumulate foreign substances, particularly solids, from the air.

The accumulator 82 includes a chamber 83, an inlet tube 84a that is open to the surface 74a, and an outlet passage 84b. The inlet tube 84 extends into the chamber 83.

Air and entrained foreign substances flow into the chamber via the inlet tube 84. Inside the chamber 83, the air swirls and diffuses forward around the sides of the inlet tube 84. The slowing of the air flow causes the solids to fall out of the flow inside the chamber 83. Since the inlet tube 84 extends into the chamber 83 it is difficult for the solids to escape. The air then exits through the outlet passage 84b. The solids thus accumulate inside the chamber 83. Additionally, if the accumulator 82 is in the spinner 74 or other rotating structure, the rotation may create a centrifugal effect that throws the particles outwards, thereby further trapping the particles inside the chamber 83.

The accumulated foreign substances in the chamber 83 can be collected while the accumulator 82 remains on the component. For example, the substances can be removed via a vacuum and then submitted for analysis as described above. Alternatively, the accumulator 82 can be removed from the component and the substances can then subsequently be removed from the chamber 83 for analysis.

Figure 11B:
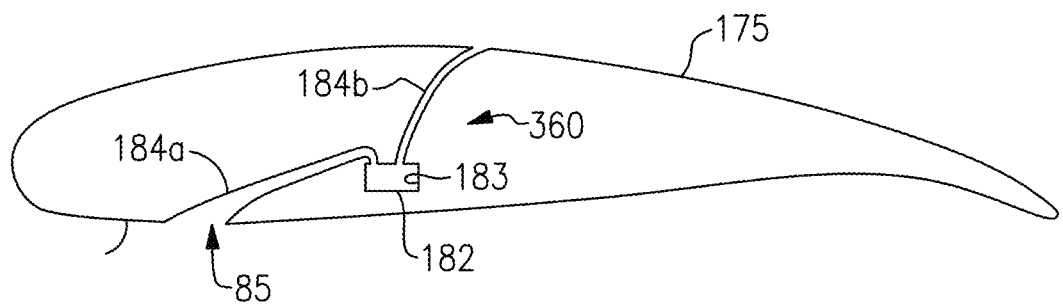
FIG. 11B illustrates another example of an accumulator.
Figure 11C:
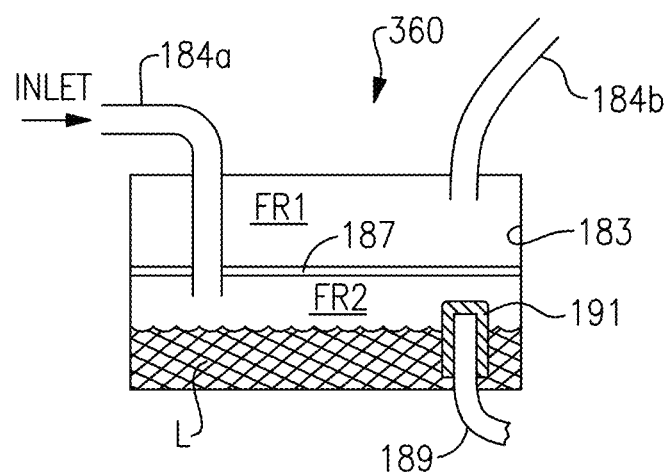
FIG. 11C illustrates the accumulator of FIG. 11B.

FIGS. 11B and 11C illustrate another example environmental sampling system 360 that is a variation of the system 260. In this example, the system 360 is in a component 175, such as an engine nacelle or case structure. The system 360 includes an accumulator 182 that has a chamber 183, an inlet tube 184a that is open to a surface 174a on which an air flow impinges when the aircraft component is in operation, and an outlet passage 184b. The inlet tube 184a may have a scoop 85, such as a low-drag inlet design, for feeding air flow into the system 360. In one example, the scoop 85 is located aft of the fan 42.

As shown in FIG. 11C, the chamber 183 includes a screen 187 that divides and separates the interior region of the chamber 183 into a first region FR1 and a second region FR2. The second region FR2 is at least partially filled with a liquid, L, such as but not limited to water and water/antifreeze mixtures. A feed tube 189 may be used to fill, empty, or circulate the liquid. A filter screen 191 can be used over the feed tube 189 to prevent foreign substances, particularly particles, from escaping the chamber 183.

In use air flow and entrained foreign substances are fed into the chamber 183 via the inlet tube 184a. The inlet tube opens in the second region FR2. Any entrained foreign substance is captured and retained by the liquid. The air then flow through the screen 187 and is discharged through the outlet passage 184*b*. The foreign substances thus accumulate in the chamber 183. The accumulated foreign substances can be collected by removing the chamber 183 from the component and the substances can then subsequently be removed from the chamber 183 for analysis as described above. Alternatively, the substances can be collected while the accumulator 182 remains on the component by collecting the liquid/substance through the tube 189 and the substances can then subsequently be submitted for analysis. Additionally or alternatively, the screen 187 and/or filter 191 may serve to capture and retain foreign substances. In this regard, the substances can also be collected from the screen 187 and/or filter 191 for analysis.

Figure 12:
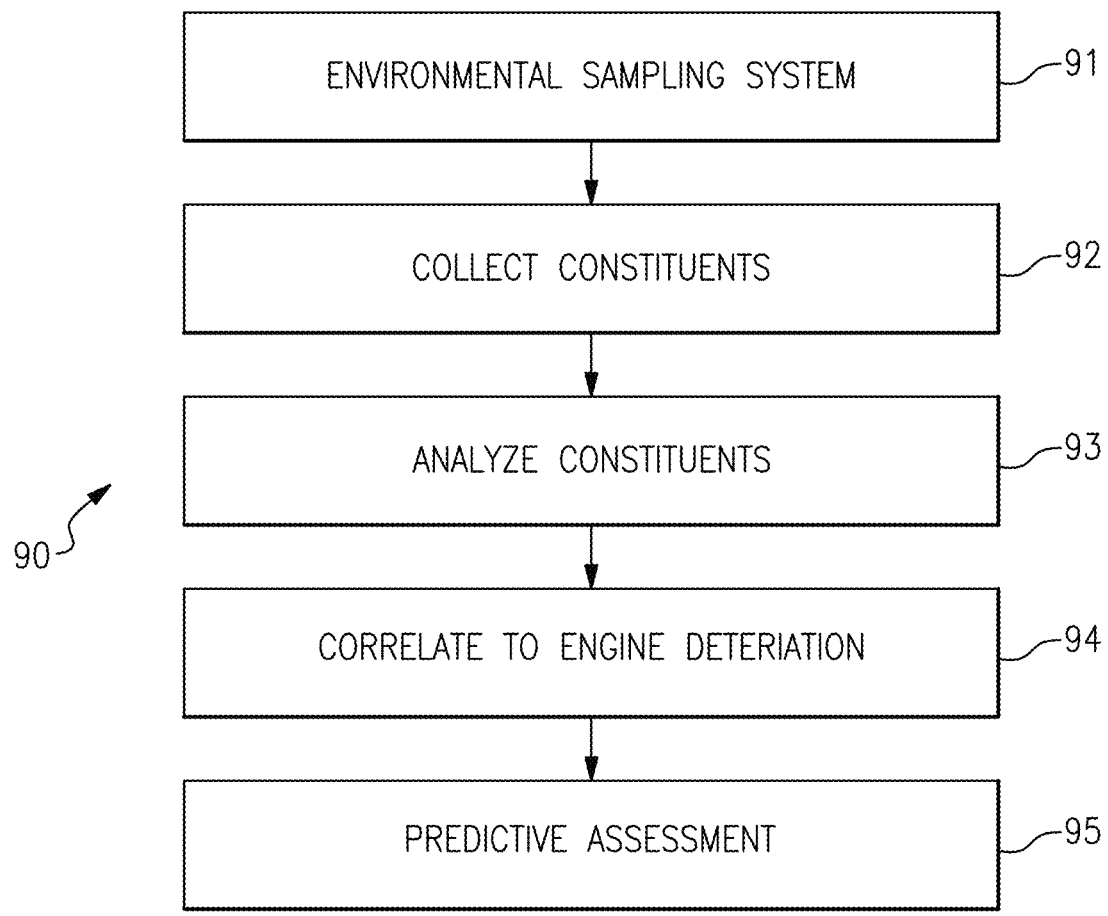
FIG. 12 illustrates an example method of environmental sampling.

The examples described above also represent examples of a method 90 of environmental sampling, which is depicted schematically in FIG. 12. Generally, the method 90 includes step 91 in which an environmental sampling system is provided in an aircraft. For instance, the provision of the system can include actual furnishing of the system or mere presence or use of such a system in an aircraft. At step 92, after the aircraft has flown, the constituents (foreign substances) are collected by either removing the collector from the aircraft or removing the constituents from the collector. An example of removing the collector is described above with reference to collector 64. An example of removing constituents from a collector is described above with reference to accumulator 82. At step 93 the constituents are analyzed, as also described earlier herein, to determine at least one characteristic associated with the constituents. In some examples, the method 90 may conclude there. In further examples, the method 90 may additionally include correlating the characteristic to deterioration 94 of a gas turbine engine, which is described above with reference to engine component distress. It is to be further understood that the earlier examples of the systems and their operations herein also constitute examples of aspects of the method 90. In further examples, the method may additionally include a predictive assessment step 95. In step 95 the relationships herein above are used to establish fleet management plans, warranty planning, material resource planning and placement for spare parts and overhaul schedules, remaining useful life estimates, and/or engine removal rate predictions.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A method of environmental sampling, the method comprising:
providing an environmental sampling system in an aircraft spinner that is operable to rotate about a central axis, the aircraft spinner has a surface on which an air flow impinges when the aircraft spinner is in operation, the environmental sampling system including an accumulator that includes a chamber and an inlet tube that is open to the surface for intake of the air flow when the aircraft flies, the inlet tube extends through a chamber front wall and partially into the chamber, the inlet tube terminates adjacent a back wall of the chamber that is opposite the front wall such that a swirl is imparted to the air flow that exits the inlet tube in the chamber, the swirl and centrifugal force from rotation of the spinner throwing constituents in the air flow radially outwardly to thereby retain constituents from the air flow;
after the aircraft has flown, collecting the constituents by either removing the accumulator from the aircraft or removing the constituents from the accumulator; and
analyzing the constituents to determine at least one characteristic associated with the constituents.

2. The method as recited in claim 1, wherein the collecting of the constituents includes removing the accumulator from the aircraft.

3. The method as recited in claim 1, wherein the collecting of the constituents includes removing the constituents from the accumulator while the accumulator is on the aircraft.

4. The method as recited in claim 1, wherein the analyzing includes weighing the removable collector.

5. The method as recited in claim 1, wherein the analyzing includes performing an elemental analysis.

6. The method as recited in claim 1, wherein the analyzing includes performing x-ray analysis.

7. The method as recited in claim 1, wherein the analyzing includes extracting the constituents from the removable collector using a carrier fluid.

8. The method as recited in claim 1, wherein the analyzing includes performing a particle size analysis.

9. The method as recited in claim 1, wherein the analyzing is selected from the group consisting of weighing the removable collector, performing an elemental analysis, performing x-ray analysis, extracting the constituents from the accumulator using a carrier fluid, performing particle size analysis, and combinations thereof.

10. The method as recited in claim 1, further comprising correlating the at least one characteristic to deterioration of a gas turbine engine.

11. An environmental sampling system comprising:
an aircraft spinner that is operable to rotate about a central axis, the aircraft spinner having a surface on which an air flow impinges when the aircraft spinner is in operation; and
an accumulator including a chamber, an inlet tube that is open to the surface for intake of the air flow, and an outlet passage leading from the chamber, the inlet tube extending through a chamber front wall and partially into the chamber, the inlet tube terminating adjacent a back wall of the chamber that is opposite the front wall such that a swirl is imparted to the air flow that exits the inlet tube in the chamber, the swirl and centrifugal force from rotation of the spinner throwing particles in the air flow radially outwardly to thereby trap the particles in the chamber.

12. The environmental sampling system as recited in claim 11, wherein the outlet passage leads from a radially outer wall of the chamber.

13. The environmental sampling system as recited in claim 11, wherein the inlet tube opens to the surface at a stagnation point of the surface.

14. An environmental sampling system comprising:
an aircraft spinner that is operable to rotate about a central axis, the aircraft spinner having a surface on which an air flow impinges when the aircraft spinner is in operation; and an accumulator including a chamber and an inlet tube that is open to the surface and that extends into the chamber, wherein
the accumulator is rotatable with the aircraft spinner.

* * * * *